US011697465B2

(12) United States Patent
Visenzi

(10) Patent No.: US 11,697,465 B2
(45) Date of Patent: Jul. 11, 2023

(54) SUPPORT KIT FOR MOTORCYCLE BAG

(71) Applicant: GIVI S.P.A., Flero (IT)

(72) Inventor: Giuseppe Visenzi, Brescia (IT)

(73) Assignee: GIVI S.P.A., Flero (IT)

( * ) Notice: Subject to any disclaimer, the term of this patent is extended or adjusted under 35 U.S.C. 154(b) by 92 days.

(21) Appl. No.: 17/274,248

(22) PCT Filed: Nov. 4, 2019

(86) PCT No.: PCT/IB2019/059426
§ 371 (c)(1),
(2) Date: Mar. 8, 2021

(87) PCT Pub. No.: WO2020/095164
PCT Pub. Date: May 14, 2020

(65) Prior Publication Data

US 2021/0347431 A1 Nov. 11, 2021

(30) Foreign Application Priority Data

Nov. 5, 2018 (IT) ........................ 102018000010026

(51) Int. Cl.
*B62J 9/27* (2020.01)
*B62J 9/26* (2020.01)

(52) U.S. Cl.
CPC .. *B62J 9/27* (2020.02); *B62J 9/26* (2020.02)

(58) Field of Classification Search
CPC ......... B62J 9/27; B62J 9/26; B62J 9/23; B62J 9/24

(Continued)

(56) References Cited

U.S. PATENT DOCUMENTS 2,966,938 A * 1/1961 Ooton ........................ B62J 1/28 297/352
5,405,068 A 4/1995 Lovett
(Continued)

FOREIGN PATENT DOCUMENTS

CN 101801775 A 8/2010
CN 203958434 U 11/2014
(Continued)

OTHER PUBLICATIONS

CN Office Action dated Oct. 28, 2021 re: Application No. 201980063926.6, pp. 1-20, citing: CN104602998A, U.S. Pat. No. 6,053,384A, CN108137111A, US2006220406A1, CN101801775A, DE202008012899U1, DE202009004989U1 and CN203958434U.
(Continued)

*Primary Examiner* — Adam J Waggenspack
(74) *Attorney, Agent, or Firm* — Cantor Colburn LLP

(57) ABSTRACT

A support kit for at least one piece of bag having a support frame configured to be able to be associated with a motorcycle frame, which includes at least one tubular element having one or more through holes, one or more support components adapted to be detachably associated with the support frame and with the at least one piece of bag. The support kit further includes at least one support clamp having a first jaw and a second jaw which embraces portions of the at least one tubular element and respectively has a first and a second through hole. The kit also includes a guide screw that crosses the through holes which includes a support element adapted to support at least one portion of the at least one piece of bag.

8 Claims, 12 Drawing Sheets

100 13 16 17 11 16 10 60 62 61 50 60 65 60 70 50 61 62 12 25 20 50 15 30 22 21 70 71 14 75 15 72 25 20 50 30 22 21 10 12 70 71 75 15 72

(58) Field of Classification Search
USPC .......................................... 224/413, 429–431
See application file for complete search history.

(56) References Cited

U.S. PATENT DOCUMENTS

| | | | | |
|---|---|---|---|---|
| 6,053,384 | A | 4/2000 | Bachman | |
| 8,894,085 | B2 * | 11/2014 | Yu | B62J 1/08 280/283 |
| 8,919,158 | B2 | 12/2014 | Visenzi | |
| 10,189,525 | B2 * | 1/2019 | Allen | B62J 9/21 |
| 10,704,218 | B2 * | 7/2020 | Assinck | B63C 1/02 |
| 2006/0220406 | A1 | 10/2006 | Misaki et al. | |
| 2015/0191210 | A1 * | 7/2015 | Visenzi | B62J 9/30 70/63 |
| 2022/0204105 | A1 | 6/2022 | Visenzi | |

FOREIGN PATENT DOCUMENTS

| | | | |
|---|---|---|---|
| CN | 104602998 | A | 5/2015 |
| CN | 205737823 | U | 11/2016 |
| CN | 108137111 | A | 6/2018 |
| CO | 6731087 | A2 | 8/2013 |
| DE | 202008012899 | U1 | 2/2009 |
| DE | 202009004989 | U1 | 12/2009 |
| EP | 3815979 | A1 | 5/2021 |
| JP | 2000344164 | A | 12/2000 |
| JP | 3879437 | B2 | 2/2007 |
| WO | 2015140380 | A1 | 9/2015 |

OTHER PUBLICATIONS

International Search Report dated Feb. 11, 2020 re: Application No. PCT/IB2019/059426, pp. 1-3, citing: US 2015/0191210 A1 and U.S. Pat. No. 6,053,384 A.

Written Opinion dated Feb. 11, 2020 re: Application No. PCT/IB2019/059426, pp. 1-7, citing: US 2015/0191210 A1 and U.S. Pat. No. 6,053,384 A.

IN Office Action dated Oct. 7, 2022 re: Application No. 202147011284, pp. 1-5, citing: US 2015/191210 A1, U.S. Pat. No. 6,053,384 A, JP2000344164A.

CO Office Action dated Nov. 23, 2022 re: Application No. 18989, pp. 1-11.

* cited by examiner 10
14
16
11
17
71
72
70
15
75
22
20
21
25
12
50
30
16
70
15
62
60
61
50
13
20
22
25
21
60
65
30
100
62
60
61
50

10
11
12
13
14
20
25
30
50
60
61
62
65

14
30
20
25
62
60
11
12
60
65
62
60
61
30
20
25
10
13

20
40
34
30
22
29
15
33
10
70
24
21
15
26
23
57
50
56
25
24
31
55
12
10

100
10
11
12
13
14
15
15
16
16
17
20
20
21
21
22
22
30
30
60
63
70
70
71
72
75

14
11
60
70
20
30
12
70
20
30
10
13

13
20
30
12
20
30
60
11
10
14

12
10
27
34
22
40
21
27
20
57
56
55
70
30
31
14

20
30
27
91
95
22
92
34
40
27
82
21
85
81
33
57
56
55
31

SUPPORT KIT FOR MOTORCYCLE BAG

TECHNICAL FIELD

The present disclosure relates to a support kit for motorcycle bag.

BACKGROUND

In the state of the art support kits for bag to be welded laterally to a support frame fixed onto a frame of a bicycle or a motorcycle are known.

Disadvantageously, it is necessary to weld support means for the piece of bag to the support frame, not having the possibility to adapt it to another type or shape of bag.

Disadvantageously support kits for bag known in the art have a limited use as they cannot be assembled on any support apparatus and cannot support any piece of bag.

SUMMARY

The present disclosure provides a support kit for bag that can be universally assembled on any support frame fixable onto a frame of a bicycle or a motorcycle and that supports any piece of bag.

According to the disclosure, this is achieved by providing a support kit according to claim 1.

Other characteristics are set out in the dependent claims.

BRIEF DESCRIPTION OF THE DRAWINGS

The features and advantages of the present disclosure will be more apparent from the following description, which is to be understood as exemplifying and not limiting, with reference to the appended schematic drawings, wherein.

DETAILED DESCRIPTION OF THE DRAWINGS

Figure 1:
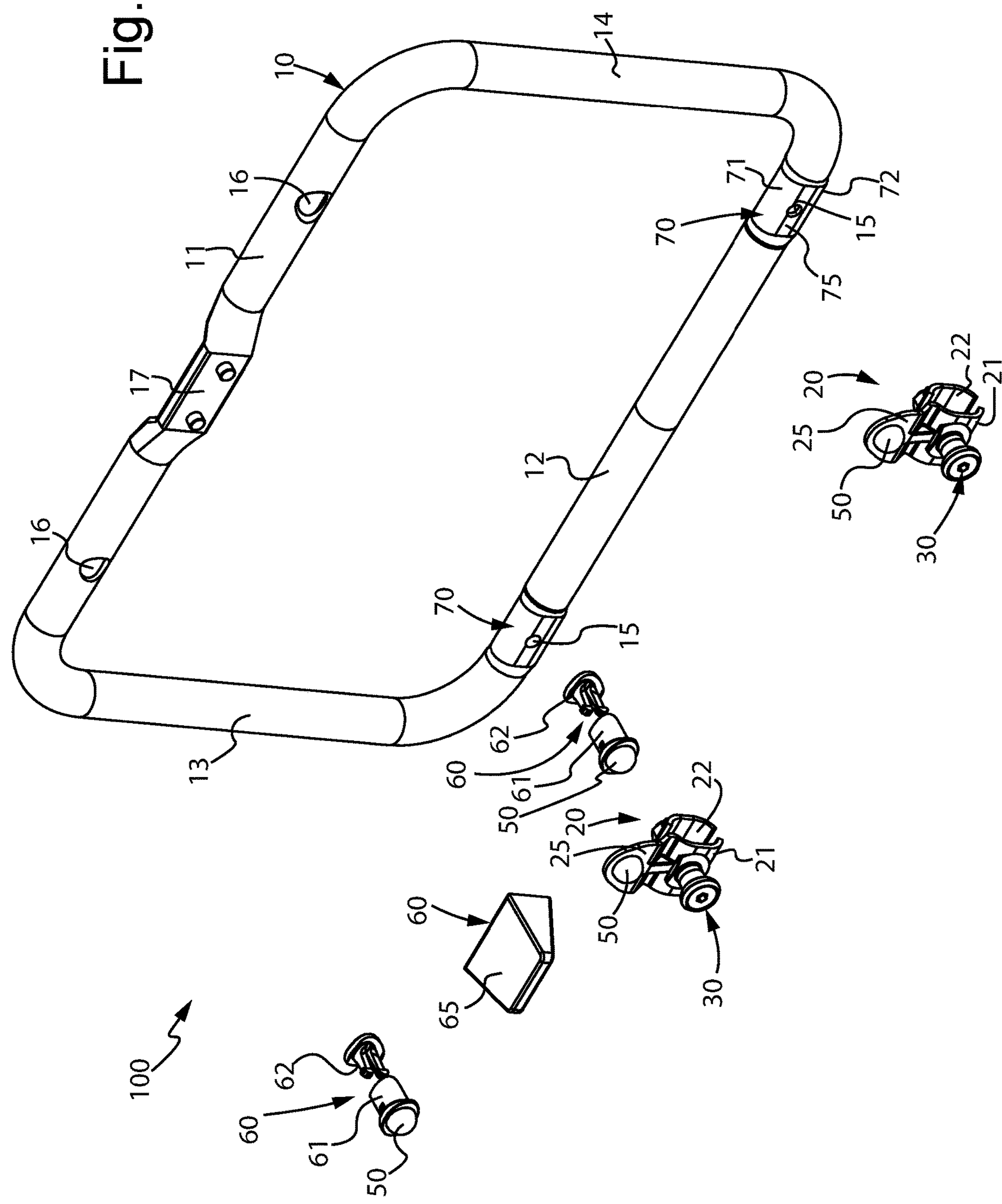
FIG. 1 is a perspective exploded view of a support kit according to the present disclosure comprising a support frame and support means comprising a lug, two anti-vibration supports and two support clamps.
Figure 2:
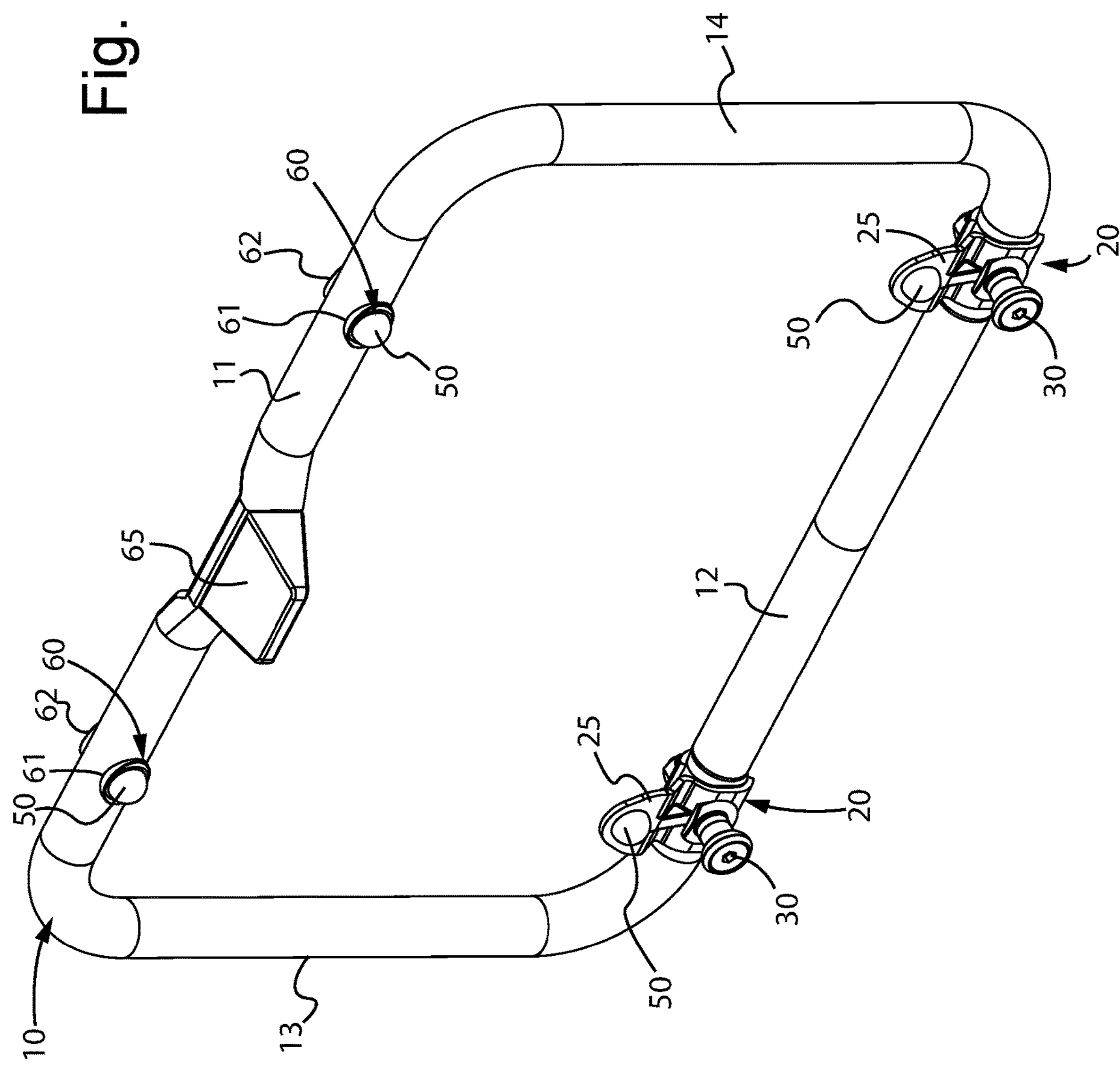
FIG. 2 is a front perspective view of the support kit of FIG. 1 in a mounted configuration.

With reference to the cited figures and in particular to FIGS. 1-7, a support kit 100 is shown for at least one piece of bag, where said support kit 100 can be detachably associated with a motorcycle frame.

Considering said frame 100 it is possible to define a transversal direction to the motorcycle, where the transversal direction comprises an internal direction to the motorcycle and an external direction to the motorcycle.

The support kit 100 for at least one piece of motorcycle bag comprising a support frame 10 is configured to be able to be associated with a motorcycle frame, where said support frame 10 comprises at least one tubular element 11-14 comprising one or more through holes 15 drilled in said at least one tubular element 11-14. In particular, considering FIG. 1, a lower tubular element 12 comprises two through holes 15 at the sides of the lower tubular element 12.

The support frame 10 has a quadrangular shape envisaging an upper tubular element 11, the lower tubular element 12 and two vertical tubular elements 13, 14 arranged at 90 sexagesimal degrees to each other and on a same geometric plane so as to be parallel to one of the faces of a piece of bag of said at least one piece of bag.

The support kit 100 comprises one or more support means 20, 60 adapted to be detachably associated with said support frame 10 and with said at least one piece of bag, where said one or more support means 20, 60 comprise at least one support clamp 20 and an upper support means 60 comprising a lug 65 and two pairs of anti-vibration supports 61, 62.

Said upper tubular element 11 of said support frame 10 comprises two through openings 16 adapted to allow the mounting by jointing of said two pairs of anti-vibration supports. Each anti-vibration support comprises a front portion 61 that is the seat of an anti-vibration means 50 made of anti-vibration material, preferably rubber, and a rear portion 62 adapted to be jointed with said front portion 61. Said anti-vibration means 50 is adapted to support at least one portion of said at least one piece of bag.

Each of said two anti-vibration supports is mounted so that said first portion 61 is inserted in a transversal direction from the front direction of said through opening 16 and in that said second portion 62 is inserted in the transversal direction from the rear direction of said through opening 16 and in that said first 61 and said second portion 62 are jointed into one another and with said through opening 16 of the upper tubular element 11.

Said upper tubular element 11 comprises a portion extending towards the outside of the motorcycle adapted to mount said lug 65 adapted to support at least one portion of said at least one piece of bag.

The support clamp 20 comprises a first jaw 21 that embraces a first portion of said at least one tubular element 11-14 of said support frame 10, where said first jaw 21 comprises a first through hole 23 and a second jaw 22 that embraces a second portion of said at least one tubular element 11-14 of said support frame 10, where said second jaw 22 comprises a second through hole 29. In particular, as shown in FIG. 1, two support clamps 20 are mounted with the lower tubular element 12 of said support frame 10.

The support clamp 20 comprises a guide screw 30 comprising a head 31 turned towards the outside of the motorcycle and a cylindrical body 33 which comprises at least one threaded portion 34, where said guide screw 30 is mounted through said first through hole 23 of said first jaw 21, through a through hole 15 of said one or more through holes 15 of said at least one tubular element 11-14, through said second through hole 29 of said second jaw 22, where said guide screw 30 comprises a support element 55 adapted to support at least one portion of said at least one piece of bag. When said guide screw 30 is mounted in this way, said guide screw 30 is in seat.

Said guide screw 30 comprises a portion of said cylindrical body 33 that extends towards the outside of the motorcycle extending from the external surface of the first jaw 21 of the support clamp 20.

Figure 4:
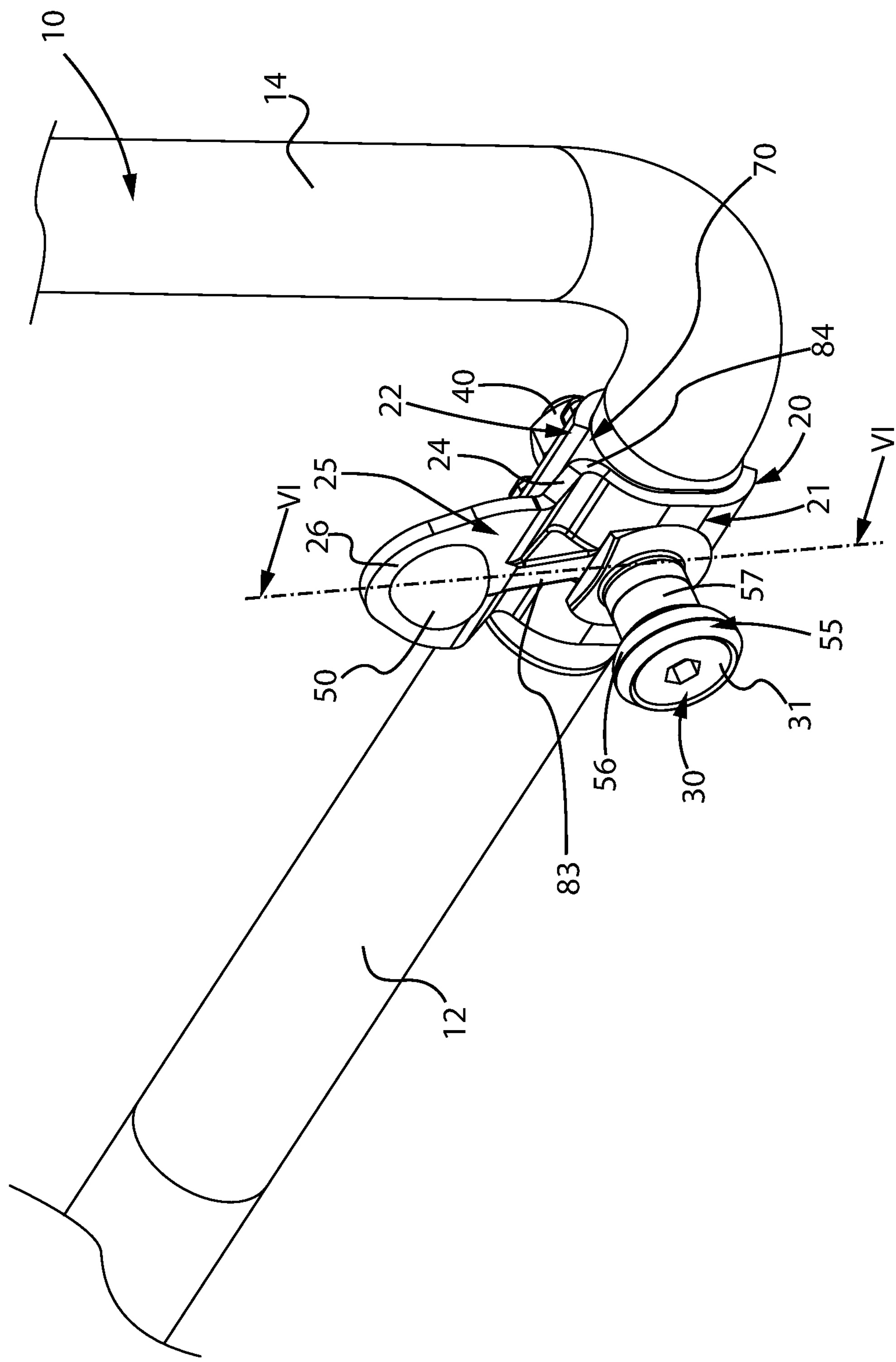
FIG. 4 is an enlarged perspective view of one of the support clamps mounted with said guide frame.
Figure 5:
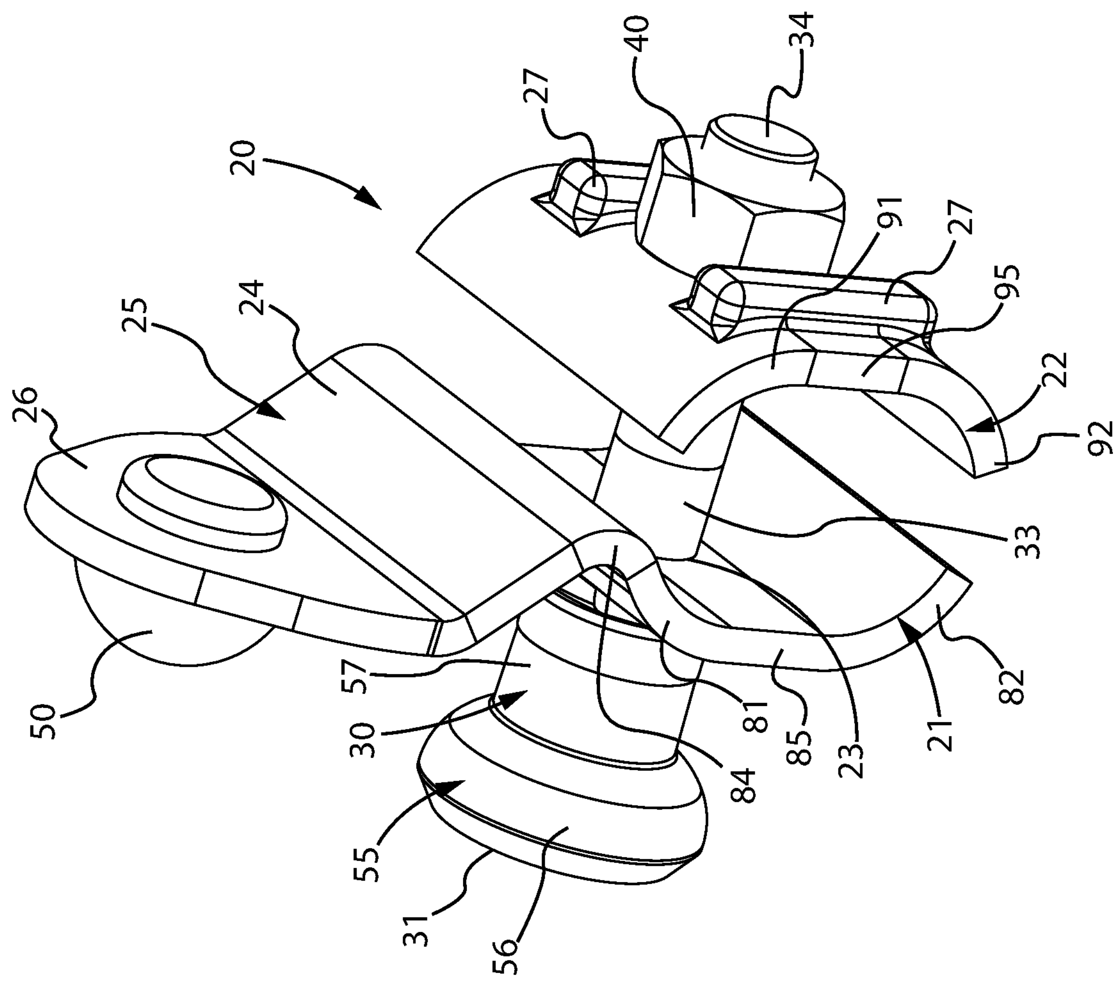
FIG. 5 is a perspective view of said support clamp dismounted from said frame, where said support clamp comprises a first and a second jaw mounted together by means of a guide screw.
Figure 6:
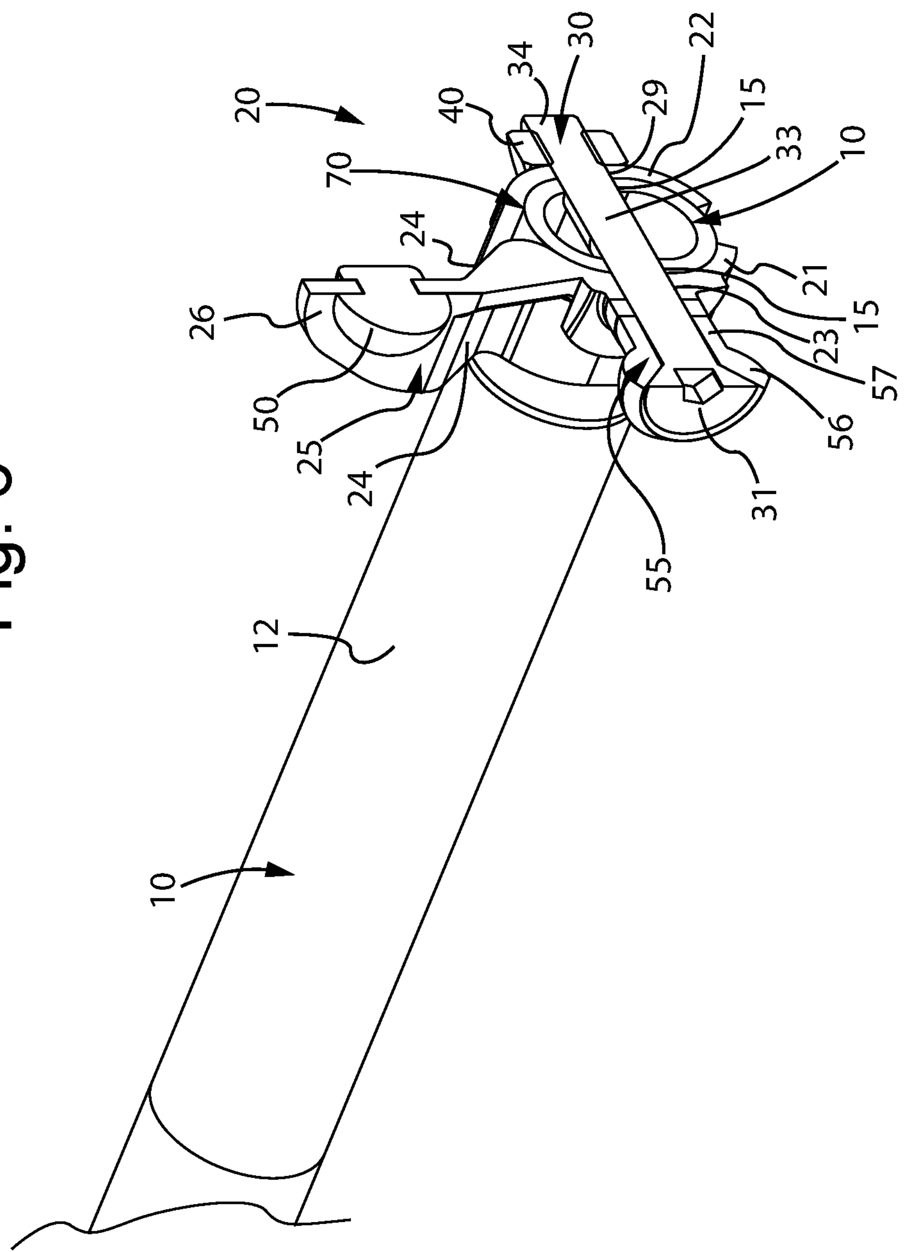
FIG. 6 is a sectional view taken along the line VI-VI in FIG. 4.

As shown in particular in FIGS. 4-6, said support element 55 comprises a first portion 56 that is fitted over at least one portion of said head 31 of said guide screw 30 and a second portion 57 that is fitted over at least one portion of said cylindrical body 33 of said guide screw 30. Said support element 55 is adapted at the top in adherence so that said first portion 56 follows the profile of the head 31 and the second portion 57 follows the profile of the front portion of the cylindrical body 33 of the guide screw 30. Said at least one portion of said cylindrical body 33 covered by said second portion 57 of the support element 55 is said portion of said cylindrical body 33 that extends towards the outside of the motorcycle extending from the external surface of the first jaw 21 of the support clamp 20. Said head 31 of said guide screw 30 has a mushroom shape adapted to be quickly connected to a complementary opening drilled in a wall of said at least one piece of bag.

Said support element 55 is made of aluminium or another material adapted to be adapted to the geometric shape of the head 31 and of the front portion of the cylindrical body 33 of the guide screw 30 so that it can support a portion of the bag.

As shown in particular in FIGS. 4-6, said first jaw 21 of said support clamp 20 comprises at least one curvilinear portion 81, 82 adapted to embrace said first portion of said at least one tubular element 11-14, in that said second jaw 22 of said support clamp 20 comprises at least one curvilinear-profile portion 91, 92 adapted to embrace said second portion of said at least one tubular element 11-14.

Said first jaw 21 of said support clamp 20 comprises a plate 25 comprising an anti-vibration means 50 adapted to support at least one portion of said at least one piece of bag.

Said plate 25 of said first jaw 21 of said support clamp 20 comprises a first portion 24 that is extended in a direction parallel to a direction along which said guide screw 30 is arranged and in a direction towards said head 31 of said guide screw 30, a second portion 26 that is extended in a vertical direction and perpendicular to said direction along which said guide screw 30 is arranged, where said second portion 26 of said plate 25 comprises said anti-vibration means 50.

Said plate 25 comprises a reinforcement element 83. Said reinforcement element 83 has a triangular profile as shown in the section in FIG. 6 and extends in the vertical direction.

Figure 7:
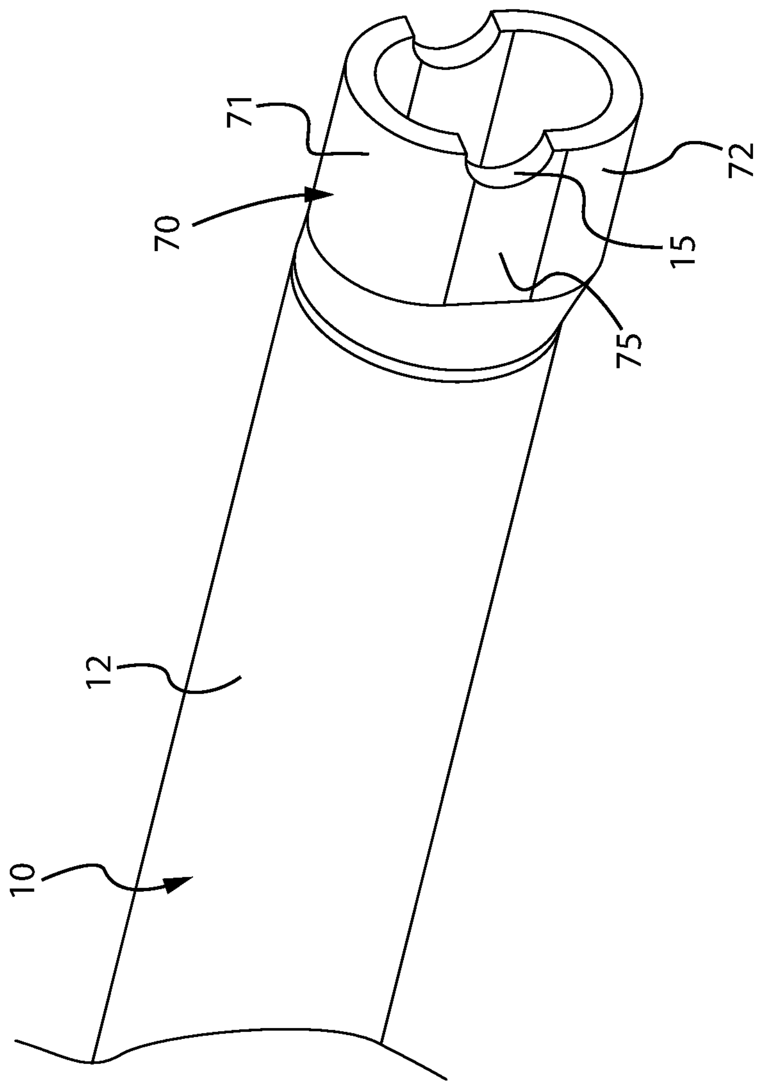
FIG. 7 is a sectional view taken along the line VI-VI of a mounting portion of a tubular element of said support frame.
Figure 8:
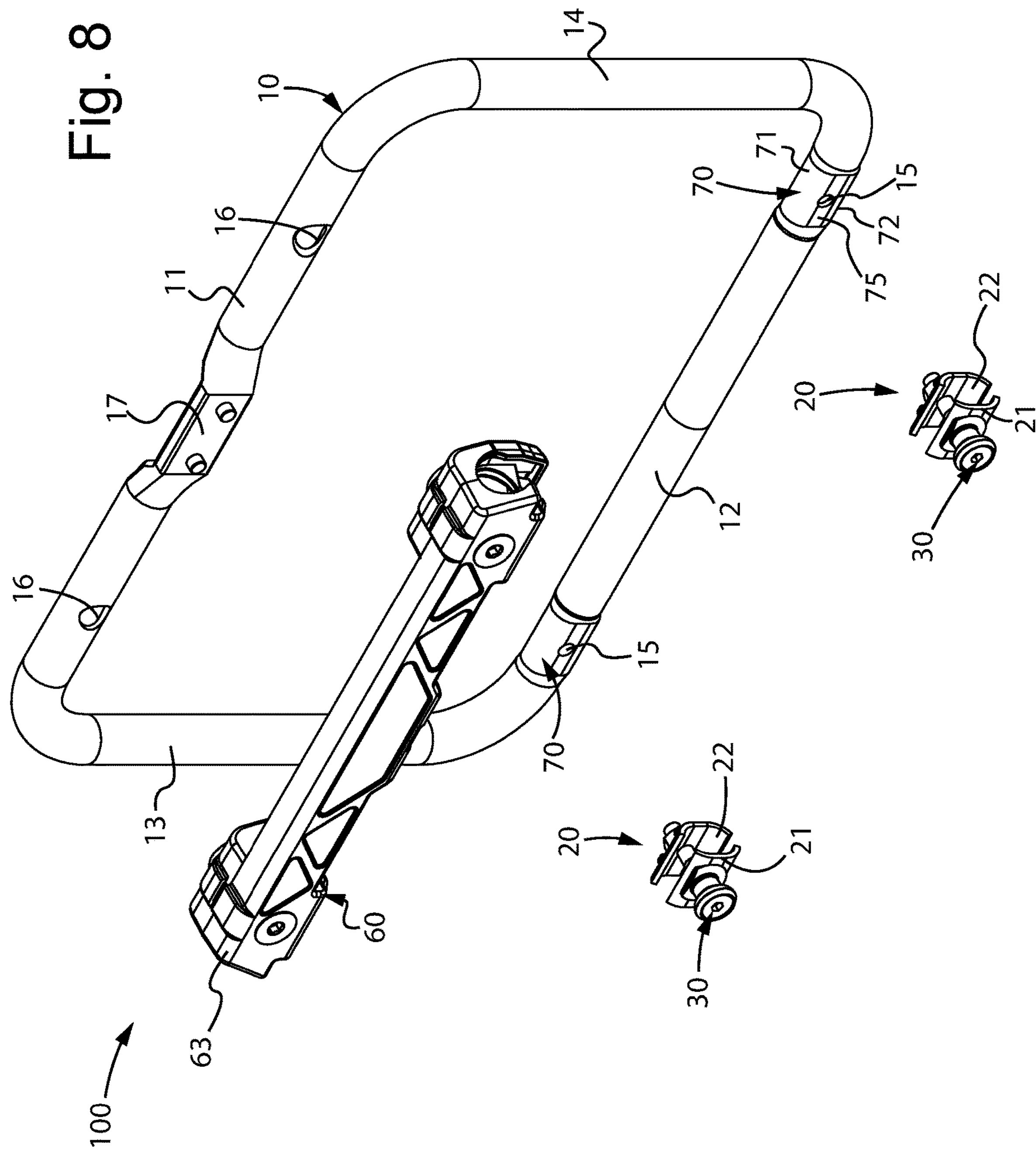
FIG. 8 is a perspective exploded view of an alternative support kit according to the present disclosure comprising a support frame and support means comprising a front panel and two alternative support clamps.
Figure 9:
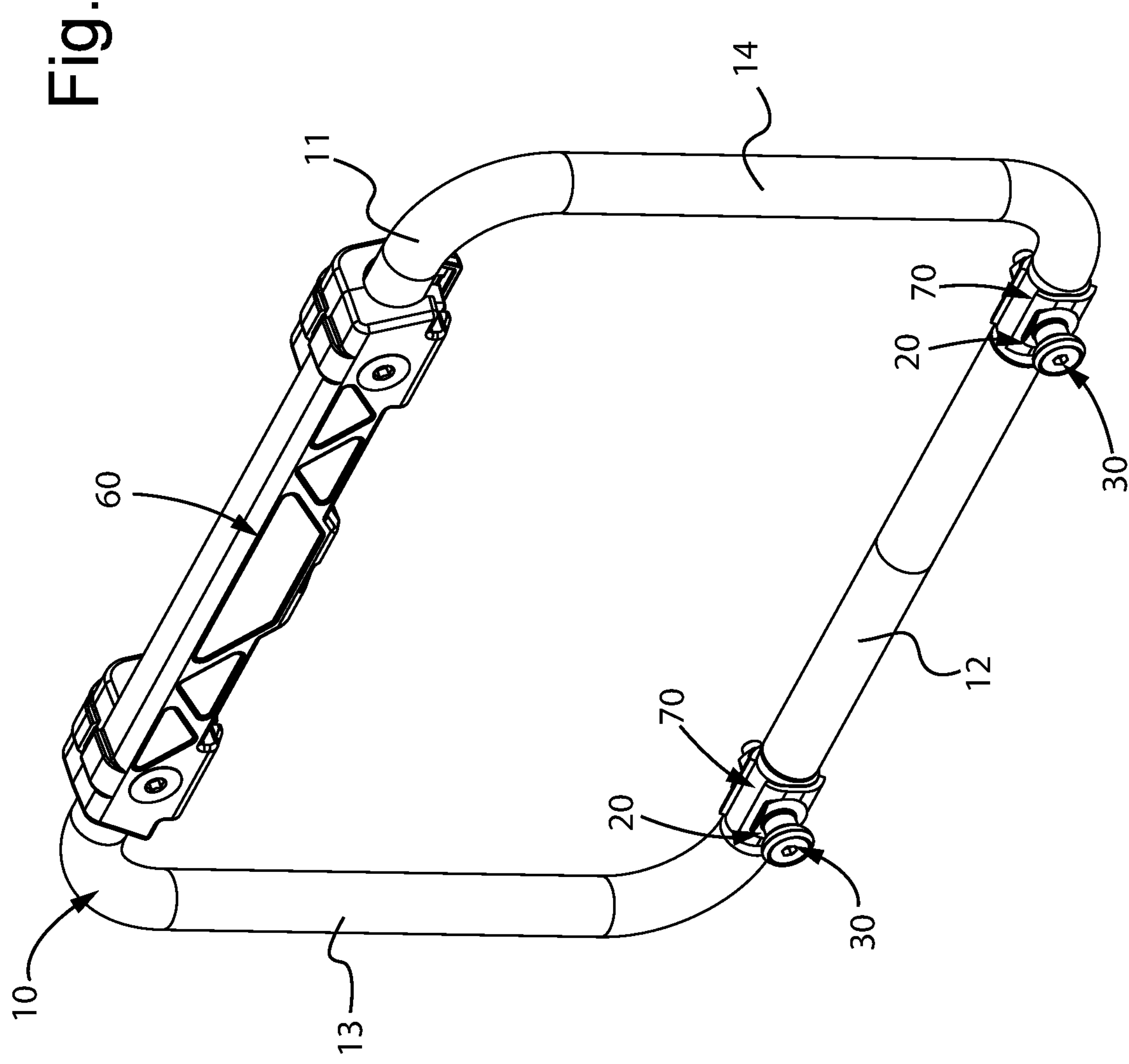
FIG. 9 is a perspective front view of the alternative support kit of FIG. 8.
Figure 10:
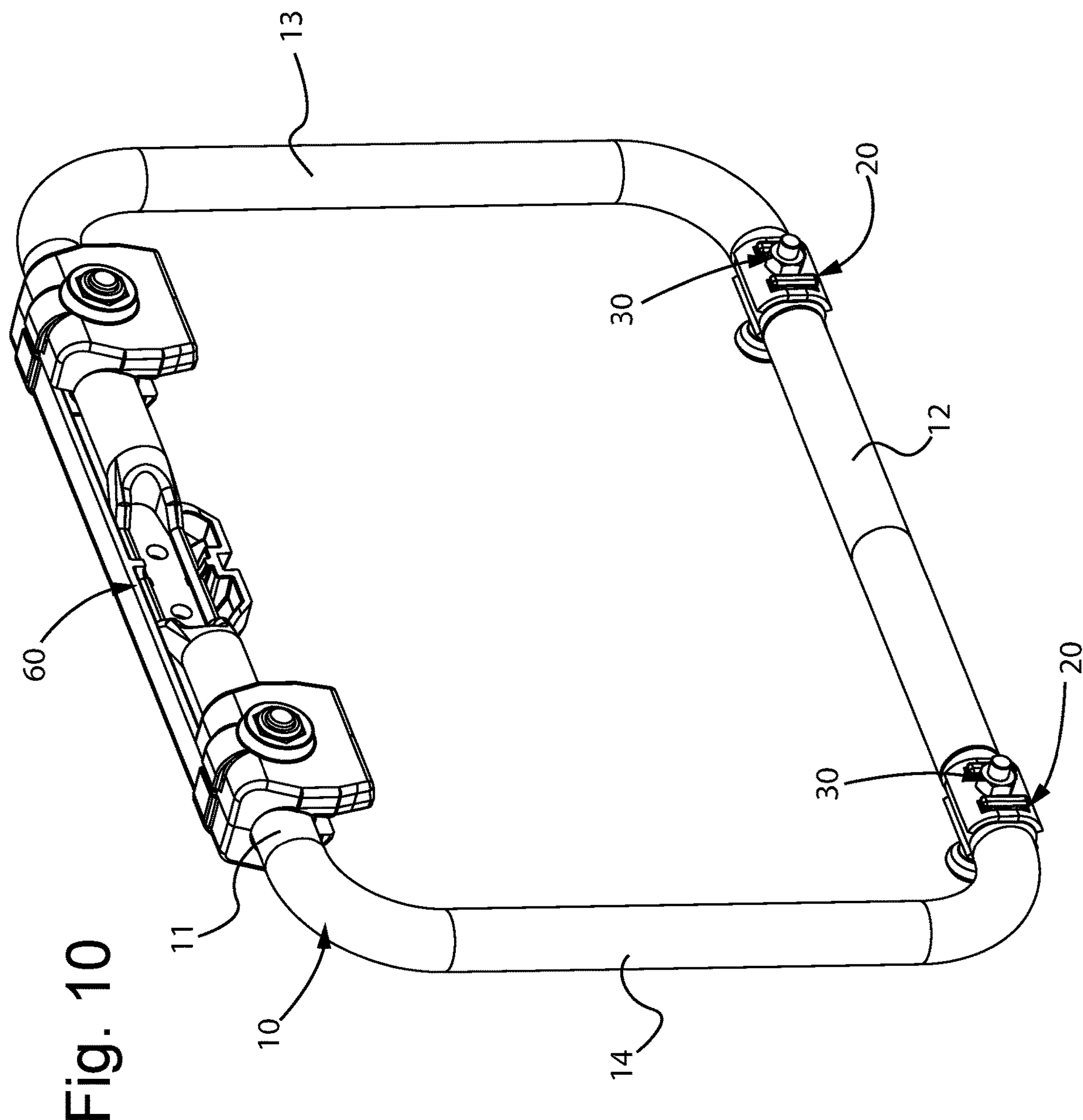
FIG. 10 is a perspective rear view of the alternative support kit of FIG. 8.
Figure 11:
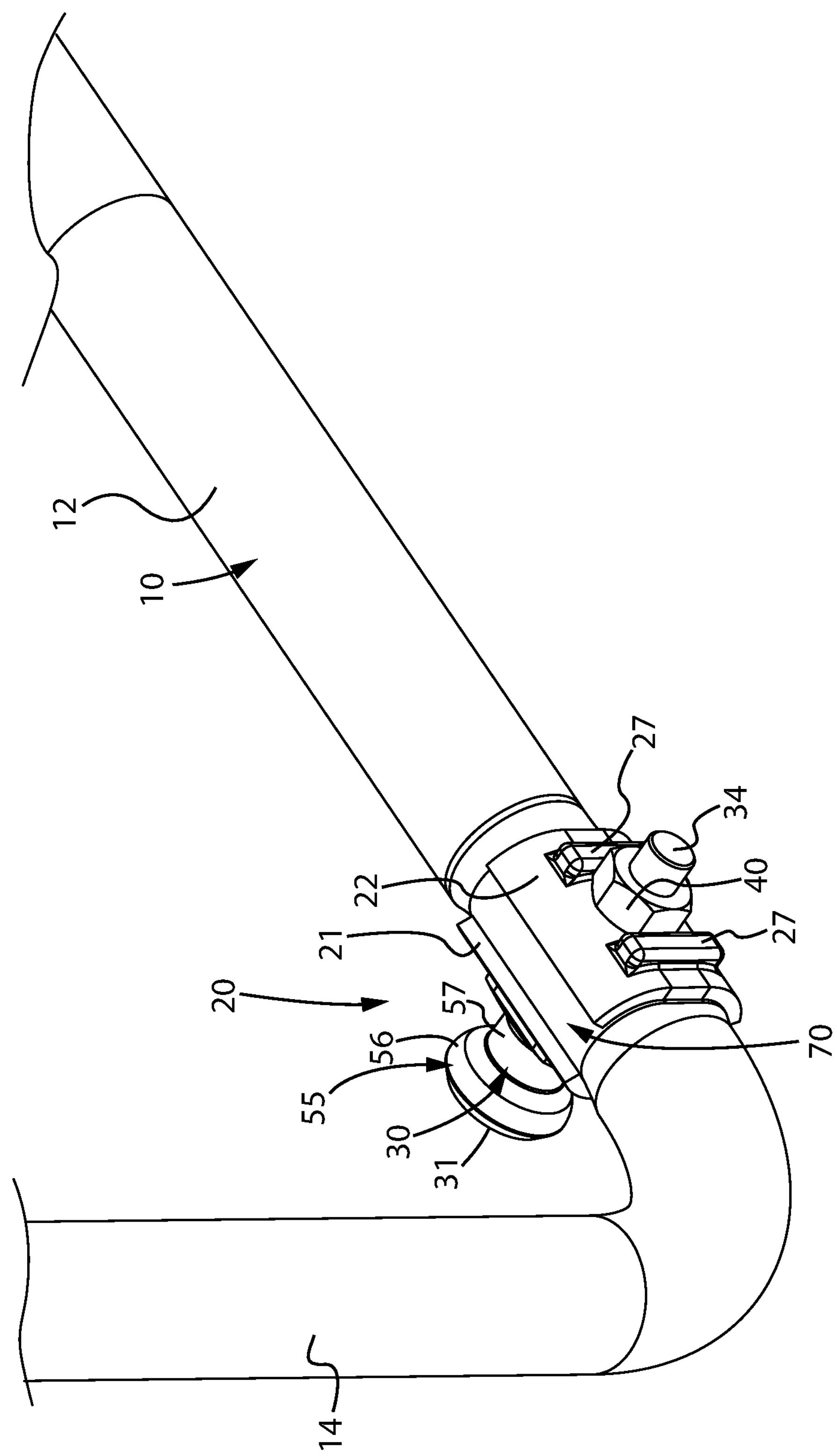
FIG. 11 is an enlarged perspective view of one of the alternative support clamps mounted with said guide frame.
Figure 12:
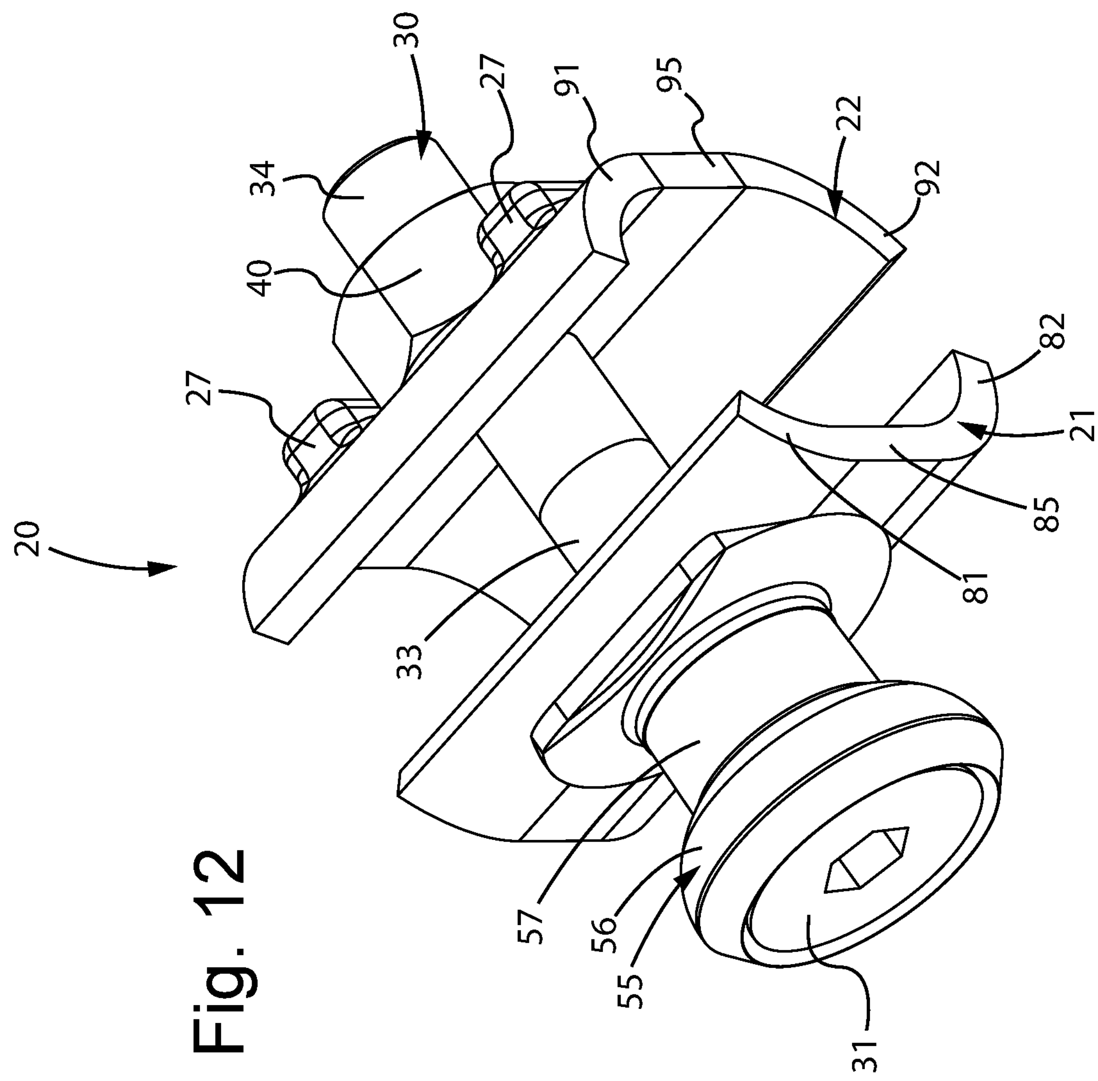
FIG. 12 is a perspective view of said alternative support clamp dismounted from said frame.

As shown in particular in FIG. 7, said at least one tubular element 11-14 of said support frame 10 comprises at least one mounting portion 70 adapted to be embraced by said support clamp 20, where said at least one mounting portion 70 comprises at least one curvilinear-profile portion 71, 72 adapted to be embraced by said first jaw 21 and by said second jaw 22 of said support clamp 20, where said mounting portion 70 comprises said through hole 15 of said at least one tubular element 11-14.

Said least one mounting portion 70 of said at least one tubular element 11-14 comprises a first curvilinear-profile portion 71, a second curvilinear-profile portion 72, a linear-profile portion 75 comprised between said first curvilinear-profile portion 71 and said second curvilinear-profile portion 72, where said through hole 15 of said at least one tubular element 11-14 is drilled between said linear-profile portion 75 and one of said first 71 and said second curvilinear-profile portion 72.

As shown in particular in the sections of FIGS. 6 and 7, said tubular element 11-14 is hollow. Said at least one mounting portion 70 of said at least one tubular element 11-14 has lower dimensions than the rest of said at least one tubular element 11-14. Said tubular element 11-14 comprises a circular cross section and said mounting portion 70 of said tubular element 11-14 comprises a substantially elliptical cross section comprising said first curvilinear-profile portion 71 arranged in the upper position, said second curvilinear-profile portion 72 arranged in the lower position and between said first 71 and second curvilinear-profile portion 72 said linear profile portion 75 being present.

As shown in particular in FIGS. 5 and 6, said first jaw 21 comprises a first curvilinear-profile portion 81 and a second curvilinear-profile portion 82 of said at least one curvilinear-profile portion 81, 82, said second jaw 22 comprises a first curvilinear-profile portion 91 and a second curvilinear-profile portion 92 of said at least one curvilinear-profile portion 91, 92, where said first curvilinear-profile portions 81, 91 of said first jaw 21 and of said second jaw 22 embrace said first curvilinear-profile portion 71 of said mounting portion 70 of said tubular element 11-14 and said second curvilinear-profile portions 82, 92 of said first jaw 21 and of said second jaw 22 embrace said second curvilinear-profile portion 72 of said mounting portion 70 of said tubular element 11-14.

Figure 3:
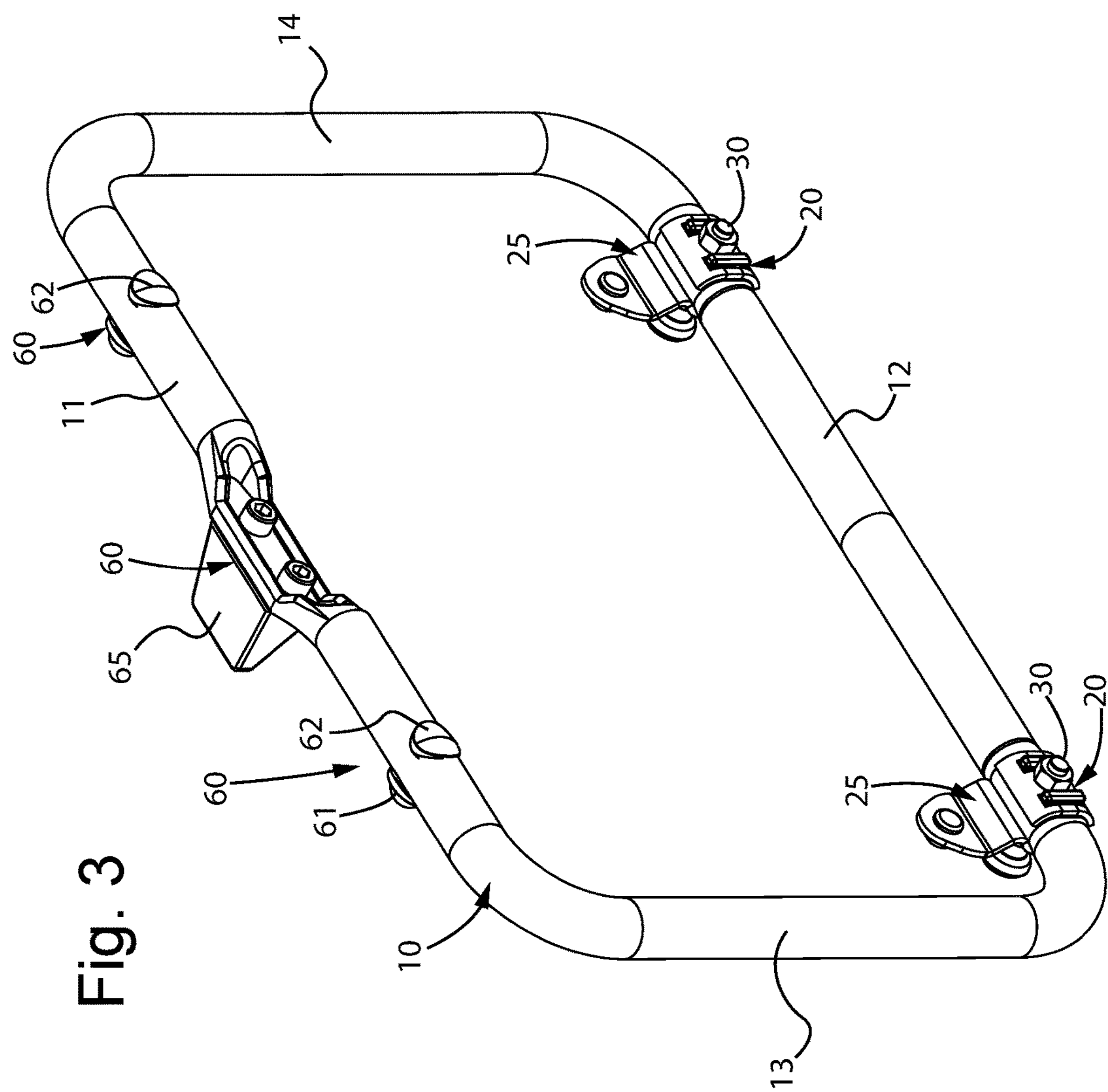
FIG. 3 is a rear perspective view of the support kit of FIG. 1 in the mounted configuration.

As shown in particular in FIGS. 3, 5 and 6, said second jaw 22 of said support clamp 20 comprises stop means 27, 40 adapted to keep said guide screw 30 mounted in seat through said through hole 23 of said first jaw 21, through said through hole 15 of said at least one tubular element 11-14 and said through hole 29 of said second jaw 22.

Said stop means 27, 40 comprise a nut 40 screwed with said at least one threaded portion 34 of said guide screw 30 and at least one stop wall 27 that extends from said second jaw 22 of said support clamp 20, where said at least one stop wall 27 is adapted to block a rotation of said nut 40 when said nut 40 is in screwed position with said at least one threaded portion 34 of said guide screw 30. The nut 40 is not a single piece with the second jaw 22. The nut 40 can be detachably screwed with the threaded portion 34 of the guide screw 30 and passes from a completely unscrewed configuration to the screwed position.

As shown in particular in FIG. 5, two vertical stop walls 27 are shown which block the rotation of said nut 40.

Said anti-vibration means 50 of the support clamps 20 and of the other support means (60) are arranged with an external surface on a same geometric plane so as to be able to enter into contact with the portions of said at least one piece of bag.

Advantageously, the cheek shape of the first 21 and of the second jaw 22 of the support clamp 20 enable the fixed coupling to at least one tubular element 11-14.

Even more advantageously, using a tubular element 11-14 comprising mounting portions 70 as described above enables a further synergistic effect whereby the jaws 21 and 22 of the support clamp 20 deform the mounting portions 70 allowing greater coupling solidity without any rotation of the guide screw 30 preventing the guide screw 30 becoming unscrewed from its own seat.

Advantageously, said support kit 100 for bag can be universally mounted on any motorcycle frame and supports any piece of bag.

Advantageously, said support kit 100 does not have to be welded to said support frame 10.

Alternatively, it is possible to provide other forms of support frame 10 on the basis of the shape of the bag.

Alternatively, it is possible to provide for various support kits 100 to be able to be mounted on a single support frame 10.

Alternatively, it is provided that at least one from among said first through hole 23 of said front jaw 21 and said second through hole 29 of said rear jaw 23 is threaded and that said threaded through hole 23, 29 is one of the stop means of said guide screw 30 in its own seat.

Alternatively, it is provided that said through hole 15 of said at least one tubular element 11-14 comprises at least one threaded portion and that said threaded through hole 15 is one of the stop means of said guide screw 30 in its own seat.

Alternatively, as shown in FIG. 8-12 it is possible to provide that said guide clamp 20 does not comprise any plate 25. In said alternative, as shown in particular in FIGS. 8-10, the support means comprises a front plate 60. The front plate 60 is mounted detachably with the upper tubular element 11. The front plate 60 comprises two portions 63 adapted to mount respective portions of said at least one piece of bag. Said front plate 60 is mounted with said through openings 16 of the upper tubular element 11. In said alternative, rubber spacers are mounted directly on the face of the piece of bag facing towards the support frame 10 and therefore the front plate 60 does not bear any anti-vibration means 50.

Alternatively, it is possible to provide for the tubular element 11-14 not to have any mounting portions 70 and the through holes 15 to be drilled directly in any portion of the tubular element 11-14.

The disclosure thus conceived is susceptible to numerous modifications and variations, all falling within the same inventive concept; furthermore, all the details can be replaced by technically equivalent elements. In practice, the materials used, as well as the dimensions, can be of any type according to the technical requirements.

The invention claimed is:

1. A support kit for at least one piece of motorcycle bag comprising:

a support frame configured to be associated with a motorcycle frame, wherein said support frame comprises at least one tubular element comprising one or more through holes drilled in said at least one tubular element;

one or more support means adapted to be detachably associated with said support frame and with said at least one piece of bag, wherein said one or more support means comprise at least one support clamp comprising a first jaw which embraces a first portion of said at least one tubular element of said support frame, wherein said first jaw comprises a first through hole;

a second jaw which embraces a second portion of said at least one tubular element of said support frame, wherein said second jaw comprises a second through hole; and a guide screw comprising a head and a cylindrical body which comprises at least one threaded portion, wherein said guide screw is mounted through said first through hole of said first jaw, through a through hole of said one or more through holes of said at least one tubular element, through said second through hole of said second jaw, wherein said guide screw comprises a support element adapted to support at least one portion of said at least one piece of bag, wherein said at least one tubular element of said support frame comprises at least one mounting portion adapted to be embraced by said support clamp, wherein said at least one mounting portion comprises at least one curvilinear-profile portion adapted to be embraced by said first jaw and by said second jaw of said support clamp, wherein said mounting portion comprises said through hole of said at least one tubular element, wherein said at least one mounting portion of said at least one tubular element comprises a first curvilinear-profile portion, a second curvilinear-profile portion, a linear-profile portion comprised between said first curvilinear-profile portion and said second curvilinear-profile portion, wherein said through hole of said at least one tubular element is drilled between said linear-profile portion and one of said first and said second curvilinear-profile portion.

2. The support kit according to claim 1, wherein said support element comprises a first portion that is fitted over at least one portion of said head of said guide screw and a second portion that is fitted over at least one portion of said cylindrical body of said guide screw.

3. The support kit according to claim 1, wherein said first jaw of said support clamp comprises at least one curvilinear portion adapted to embrace said first portion of said at least one tubular element, in that said second jaw of said support clamp comprises at least one curvilinear-profile portion adapted to embrace said second portion of said at least one tubular element.

4. The support kit according to claim 1, wherein said first jaw of said support clamp comprises a plate comprising an anti-vibration means adapted to support at least one portion of said at least one piece of bag.

5. The support kit according to claim 4, wherein said plate of said first jaw of said support clamp comprises a first portion that is extended in a direction parallel to a direction along which said guide screw is arranged and in a direction towards said head of said guide screw, a second portion that is extended in a vertical direction and perpendicular to said direction along which said guide screw is arranged, wherein said second portion of said plate comprises said anti-vibration means.

6. The support kit according to claim 3, wherein said first jaw comprises a first curvilinear-profile portion and a second curvilinear-profile portion of said at least one curvilinear-profile portion, said second jaw comprises a first curvilinear-profile portion and a second curvilinear-profile portion of said at least one curvilinear-profile portion, wherein said first curvilinear-profile portions of said first jaw and of said second jaw embrace said first curvilinear-profile portion of said mounting portion of said tubular element and said second curvilinear-profile portions of said first jaw and of said second jaw embrace said second curvilinear-profile portion of said mounting portion of said tubular element.

7. The support kit according to claim 1, wherein said second jaw of said support clamp comprises stop means adapted to keep said guide screw mounted in seat through said through hole of said first jaw, through said through hole of said at least one tubular element and said through hole of said second jaw.

8. The support kit according to claim 7, wherein said stop means comprise a nut screwed with said at least one threaded portion of said guide screw and at least one stop wall that is extended from said second jaw of said support clamp, wherein said at least one stop wall is adapted to block a rotation of said nut when said nut is in screwed position with said at least one threaded portion of said guide screw.

* * * * *